United States Patent
Bouillon et al.

(10) Patent No.: US 7,238,247 B2
(45) Date of Patent: Jul. 3, 2007

(54) METHOD OF MAKING A MULTI-PERFORATED PART OUT OF CERAMIC MATRIX COMPOSITE MATERIAL

(75) Inventors: Eric Bouillon, Talence (FR); Dominique Coupe, Le Haillan (FR); Rémi Bouvier, Merignac (FR)

(73) Assignee: Snecma Propulsion Solide, Le Haillan (FR)

( * ) Notice: Subject to any disclaimer, the term of this patent is extended or adjusted under 35 U.S.C. 154(b) by 432 days.

(21) Appl. No.: 10/786,409

(22) Filed: Feb. 25, 2004

(65) Prior Publication Data
US 2004/0221941 A1    Nov. 11, 2004

(30) Foreign Application Priority Data
Mar. 4, 2003    (FR) .................. 03 02613

(51) Int. Cl.
*B32B 37/00* (2006.01)
(52) U.S. Cl. .............. 156/89.26; 156/92; 156/148; 156/155
(58) Field of Classification Search ............. 156/89.26, 156/92, 155, 148, 89.22
See application file for complete search history.

(56) References Cited

U.S. PATENT DOCUMENTS

| | | | |
|---|---|---|---|
| 5,017,522 A * | 5/1991 | Hegedus ................. | 156/89.26 |
| 5,310,434 A | 5/1994 | Vives et al. ................ | 156/92 |
| 5,733,404 A * | 3/1998 | Freitas et al. ............. | 156/285 |
| 6,627,019 B2 * | 9/2003 | Jarmon et al. ........... | 156/89.26 |

FOREIGN PATENT DOCUMENTS

| | | |
|---|---|---|
| DE | 195 09 668 | 5/1996 |
| DE | 196 24 409 | 1/1997 |
| DE | 101 48 978 | 12/2002 |
| EP | 1 227 071 A3 | 1/2004 |
| FR | 2 133 041 | 11/1972 |
| GB | 624939 | 6/1949 |
| GB | 2 250 519 A | 6/1992 |
| GB | 2323056 A * | 9/1998 |
| WO | WO 97/06948 | 2/1997 |
| WO | WO 02/070217 | 9/2002 |

\* cited by examiner

*Primary Examiner*—Jeff H. Aftergut
(74) *Attorney, Agent, or Firm*—Weingarten, Schurgin, Gagnebin & Lebovici LLP

(57) ABSTRACT

A fiber preform for constituting the fiber reinforcement of composite material is prepared and then consolidated by depositing sufficient matrix phase therein to bond the fibers together while not completely densifying the preform. Pins of rigid material are put into place through the consolidated preform and densification of the consolidated preform containing the pins is continued by depositing at least a ceramic matrix phase. Thereafter, at least a portion of each pin is eliminated so as to leave a calibrated perforation passing through the resulting part, the pins being made at least in part out of a material that can be eliminated by applying treatment that does not affect the ceramic material of the matrix.

15 Claims, 2 Drawing Sheets

METHOD OF MAKING A MULTI-PERFORATED PART OUT OF CERAMIC MATRIX COMPOSITE MATERIAL

This application claims priority to a French patent application No. 03 02613 filed Mar. 4, 2003.

BACKGROUND OF THE INVENTION

The invention relates to making a multi-perforated part out of ceramic matrix composite material. A particular field of application of the invention is making combustion chamber walls for gas turbines, in particular for airplane jets, which walls are provided with a plurality of perforations enabling them to be cooled by a flow of air.

Ceramic matrix composite (CMC) materials are thermostructural materials, i.e. materials having good mechanical properties and the ability to retain them at high temperature. They comprise fiber reinforcement made of refractory fibers (generally carbon fibers or ceramic fibers) and they are densified by a ceramic matrix or by a combined carbon and ceramic matrix. An interphase layer, e.g. of pyrolytic carbon (PyC) or of boron nitride (BN) can be interposed between the reinforcing fibers and the ceramic matrix in order to improve the mechanical behavior of the material.

Making a part out of CMC normally comprises preparing a fiber preform that is to constitute the reinforcement of the composite material, and densifying the preform with a ceramic matrix, possibly after forming an interphase layer on the fibers of the preform.

The preform is made from one- or two-directional fiber fabrics such as yarns, tows, ribbons, woven cloth, unidirectional sheets, layers of felt, . . . . By way of example, preform shaping comprises steps of winding, weaving, braiding, knitting, or draping plies.

Densification can be performed by a liquid method, i.e. by impregnating the preform with a liquid composition containing a precursor for the ceramic material of the matrix. The precursor is typically a resin which, after being cured, is subjected to heat treatment for ceramization purposes.

Densification can also be performed by a gas method, i.e. by chemical vapor infiltration using a reaction gas containing one or more precursors for the ceramic matrix. The gas diffuses throughout the pores of the fiber preform, and under particular conditions of temperature and pressure it deposits ceramic on the fibers by means of one of the components of the gas decomposing or by means of a reaction taking place between a plurality of components.

The above methods of preparing CMC parts are themselves well known.

Proposals have been made to use CMCs to make the walls of gas turbine combustion chambers. The search for improved efficiency and reduced emissions of pollution require even higher temperature levels in such combustion chambers. That is why proposals have been made to use CMCs to replace the refractory metal alloys that traditionally constitute the walls of combustion chambers. It is still necessary to inject air through the wall, in particular in order to form a cooling film on the wall. Such injection is performed through a large number of small-diameter perforations, typically having a diameter lying in the range 0.2 millimeters (mm) to 0.8 mm.

A method commonly used for making such perforations in metal alloy chamber walls is laser drilling. When applied to CMC walls, that machining technique suffers from the drawback of destroying reinforcing fibers and of laying bare portions of fiber surface or of fiber-matrix interphase surface by locally removing the ceramic matrix. Destroying the fibers weakens the mechanical strength of the material. In addition, bared portions of fiber and interphase surface are exposed directly to the ambient medium, which is oxidizing, thereby making the material sensitive to erosion by oxidation if the fibers are of carbon and/or if they are provided with a PyC or BN interphase.

It might then be envisaged to deposit ceramics on the walls of the perforations, for example in a final step of chemical vapor infiltration after machining. However that affects the calibration of the perforations to a greater or lesser extent, and can even run the risk of clogging them, which reduces the effectiveness with which air is injected through the perforations. In addition, an additional step of chemical vapor infiltration then becomes necessary, and that constitutes a process which is lengthy and expensive.

OBJECT AND BRIEF SUMMARY OF THE INVENTION

An object of the invention is to provide a method that does not present the above-mentioned drawbacks, i.e. a method that enables a multiply-perforated part to be made out of CMC, which part is protected against oxidation even at the walls of the perforations, and without requiring a protective layer to be deposited on said walls after the perforations have been made.

This object is achieved by a method comprising the steps consisting in:
preparing a fiber preform for constituting the fiber reinforcement of the composite material;
consolidating the preform by depositing within it sufficient matrix phase for binding the fibers to one another, but without densifying the preform completely;
putting a plurality of pins of rigid material into place through the consolidated preform;
continuing densification of the consolidated preform provided with the pins by depositing at least one ceramic matrix phase; and
eliminating at least a portion of each pin so as to leave a calibrated perforation passing through the part, the pins being made at least in part out of a material that can be eliminated by applying a treatment that does not affect the ceramic material of the matrix.

Thus, the invention is remarkable in that the perforations are obtained after densification of the consolidated preform by eliminating the material constituting pins that were previously inserted into the consolidated preform. The pins can be made entirely out of material suitable for being eliminated. During densification of the consolidated preform, the pins are sheathed in the ceramic material of the matrix so that after the pins have been eliminated, the walls of the perforations are constituted by the ceramic material sheaths.

In a variant, the pins may be made in part out of material that can be eliminated, which part is constituted by a core, and the core is surrounded by a peripheral portion or sheath made of ceramic which is not eliminated when the core is eliminated. The ceramic sheaths of the pins then constitute the walls of the perforations after the cores have been eliminated.

The pin material that can be eliminated may be a material that can be eliminated by oxidation, for example carbon or a carbon composite material. For example it is possible to use pins made of carbon fiber yarn or tow stiffened by densification using an organic or carbon matrix. The organic matrix is made of a material that leaves a carbon residue on being subjected to heat treatment, with the organic matrix possibly being transformed in the carbon after the pins have been put into place, during the rise in temperature that is needed for densifying the consolidated preform.

Other materials can be used for making the pins, or at least the cores thereof, providing said materials can be eliminated without harming the ceramic matrix of the CMC.

The pins are advantageously put into place by a process comprising prior insertion of the pins into a block of compressible material, bringing the block of compressible material into contact with the consolidated preform, and applying ultrasound energy to the pins while simultaneously compressing the block of compressible material so as to cause the pins to penetrate into the consolidated preform. Such a method of inserting reinforcing pins is itself known. Reference can be made in particular to document WO 97/06948.

The pins can be put into place in any desired direction relative to the surface of the consolidated fiber preform, and in particular in a direction that is at a non-zero angle relative to the normal of said surface.

The step of consolidating the preform consists in depositing within it a material that achieves partial densification of the preform with a matrix phase so as to bond the fiber preform together sufficiently to enable the preform to be handled and the pins to be put into place without the preform being deformed, after which the consolidated preform can be densified without requiring tooling to hold the preform in shape.

Consolidation is preferably performed in such a manner as to leave the largest possible fraction of the initial pores of the preform empty, with the empty fraction of the pores being reduced by 40% at most, for example being reduced by a quantity lying in the range 8% to 40%. Typically, for a fiber preform initially presenting an empty volume ratio lying in the range 50% to 70%, consolidation is performed so as to reduce the empty volume ratio to a value lying in the range 40% to 60%.

Consolidation is advantageously performed by depositing a small thickness of carbon or ceramic matrix phase on the fibers of the preform. This matrix phase may be deposited using a liquid method, i.e. by impregnating the preform with a liquid composition containing a carbon or ceramic precursor, and then transforming the precursor, generally by heat treatment. The precursor is typically a resin.

Consolidation is preferably by chemical vapor infiltration. Under such circumstances, a ceramic matrix phase may optionally be deposited after forming an interphase layer of PyC or BN on the fibers.

The step of continuing densification of the consolidated preform may be performed by a liquid method or by chemical vapor infiltration.

The method of the invention is particularly suitable for making the multi-perforated wall of a gas turbine combustion chamber. The fiber preform may be made from a multilayer fabric obtained by weaving, knitting, or braiding in three dimensions. It may also be formed by draping, i.e. by superposing plies of a two-dimensional fiber fabric. Draping is performed on a support of a shape that corresponds to the shape of the wall that is to be made. The draped plies, e.g. comprising woven cloth or sheets of yarn, can be bonded together by needling or by bonding stitches, for example. Consolidation is performed while keeping the preform in tooling of the desired shape. The pins are put into place into the consolidated preform at an orientation relative to a surface thereof corresponding to the orientation desired for the perforations.

BRIEF DESCRIPTION OF THE DRAWINGS

The invention will be better understood on reading the following description given by way of non-limiting indication and made with reference to the accompanying drawings, in which.

DETAILED DESCRIPTION OF IMPLEMENTATIONS

A particular implementation of the invention is described in the context of its application to using CMC for making the multiply-perforated wall of a gas turbine combustion chamber for an airplane jet.

Figure 1:
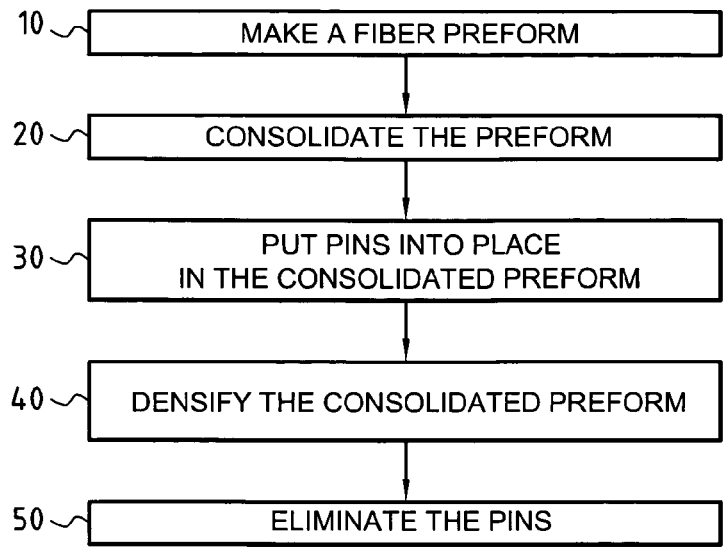
FIG. 1 is a flow chart showing the successive steps in a method of a particular implementation of the invention.

A first step 10 (FIG. 1) consists in making a fiber preform of a shape close to the shape of the chamber wall that is to be made. Various known methods can be used for this purpose.

Thus, a preform can be made in the form of a multilayer fabric obtained by weaving, knitting, or braiding filaments, yarns, or tows in three dimensions, with bonding between layers being provided by passing filaments, yarns, or tows from one layer to another while making the preform.

The preform may also be made by draping, i.e. by superposing and shaping plies of two-dimensional fiber texture on a jig or former until a desired thickness has been obtained. By way of example, the fiber fabric may be a woven fabric, a unidirectional sheet of yarns, or a laminate made up of a plurality of unidirectional sheets of yarns superposed in different directions and bonded together, e.g. by light needling. The superposed plies may be bonded to one another, e.g. by needling. A needling device that is suitable for this purpose is described in U.S. Pat. No. 5,226,217. In a variant, the superposed plies may be bonded together by stitching or by implanting yarns.

The preform may be made of carbon fibers or of ceramic fibers, for example silicon carbide fibers. The operations needed for making the preform are implemented on carbon fibers or ceramic fibers. It is also possible to implement those operations on fibers that are precursors of carbon or of ceramic, with the precursor being transformed into carbon or ceramic by applying heat treatment after the preform has been made.

The resulting fiber preform is consolidated (step 20) while being held in shape in tooling. Consolidation is obtained by depositing matrix thinly, but at a thickness that is sufficient for bonding the fibers of the preform to one another. Consolidation thus achieves only partial densification of the fiber preform, leaving the major fraction of the initial volume of the pores empty. The volume ratio of the pores is reduced by not more than 40%, for example by about 8% to 40%, e.g. reducing the pore volume ratio from a value lying in the range about 50% to 70% to a value lying in the range about 40% to 60%.

The material deposited for consolidation purposes is carbon or a ceramic, for example silicon carbide (SiC). This can be achieved by chemical vapor infiltration performed in an enclosure at a temperature of about 900° C. to 1050° C. at a pressure of less than 25 kilopascals (kPa) and using a reaction gas containing methyltrichlorosilane (MTS) as a precursor for SiC and hydrogen gas ($H_2$). The hydrogen acts as a vector gas and encourages diffusion of the reaction gas within the fiber preform and encourages the formation of an SiC deposit therein by decomposing the MTS. A method of forming an SiC matrix by chemical vapor infiltration is described in U.S. Pat. No. 5,738,908.

A interphase of PyC or of BN can be formed on the fibers of the preform prior to depositing the SiC matrix phase for consolidation purposes. The interphase may be formed by chemical vapor infiltration as described in U.S. Pat. No. 4,752,503.

When performing consolidation by a carbon matrix phase obtained by chemical vapor infiltration, it is possible, likewise in known manner, to use a reaction gas comprising a mixture of methane and propane, operating at a temperature of about 950° C. to 1100° C. under a pressure of less than 25 kPa.

In a variant, consolidation may be performed by a liquid method. While being held in tooling, the preform is impregnated by a liquid composition containing a precursor of the material that is to be formed. The precursor is typically a resin. By way of example, it is possible to use a carbon precursor phenolic resin or an SiC precursor resin of polycarbosilane or polytitanocarbosilane type. After impregnation, the resin is cured, possibly after drying to eliminate a solvent, and then the resin is transformed into carbon or ceramic by heat treatment (carbonization or ceramization).

In order to limit the quantity of material that is deposited for consolidation purposes, impregnation is performed with a resin having a solid residue fraction after heat treatment that is not too high and/or with a resin that is sufficiently diluted in a solvent. The major fraction of the initial pore space in the fiber structure is restored in part once the resin has been dried and cured, and then more space is restored after carbonization or ceramization.

After consolidation, the consolidated preform is removed from the tooling that held it in shape in order to perform the step 30 of putting pins into place.

Figure 2:
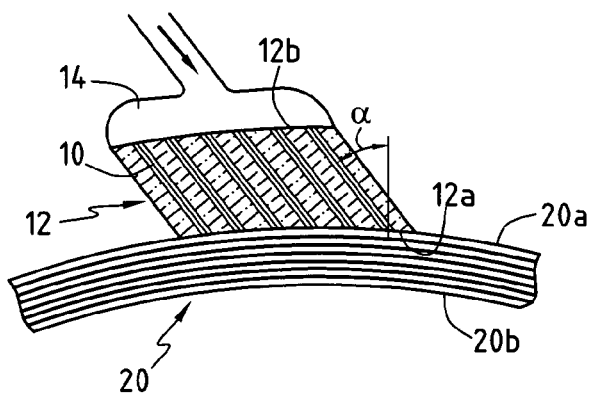
FIG. 2 is a highly diagrammatic view showing the process of putting the pins into a consolidated fiber preform.

The pins are advantageously put into place using a method of the type described in document WO 97/06948. As shown in FIG. 2, the pins 10 for putting into place are initially inserted in a block 12 of compressible material, for example a foam or an elastomer. The pins extend between two opposite faces 12 and 12b of the block 12. One of the faces 12a of the block is brought into contact with a surface zone 20a of the consolidated preform 20 at a location corresponding to the location in the future CMC wall where perforations are to be formed. A transducer 14 connected to an ultrasound generator (not shown) is pressed against the other face 12b of the block 12 so as to transfer the pins through the consolidated preform by applying ultrasound energy and compression to the block 12. The process is repeated, if necessary, so as to put pins into place in all of the zones of the preform that corresponds to locations where perforations are to be formed.

The pins are optionally selected to have the same diameter, depending on the diameters required for the perforations that are to be obtained in the end. The density with which pins are put into place is selected to be constant or otherwise depending on the distribution desired for perforations in the part that is to be made.

In the example shown, the pins 10 are put into place along a direction that is inclined at a non-zero angle a relative to the normal to the surface 20a of the preform 20. The angle of inclination corresponds to the angle desired for the perforations that are to be formed in the wall of the CMC chamber. This angle may differ in different surface zones of the preform 20. It commonly lies in the range 30° to 60°. The pins 10 are of a length such as to ensure they pass right through the thickness of the consolidated preform, preferably projecting from both sides 20a and 20b of the preform.

By way of example, the pins 10 are made of a rigid material that can be eliminated by being oxidized.

In particular, it is possible to use pins made of a composite material obtained by densifying a yarn or tow made up of carbon fibers with a carbon matrix or an organic matrix, the organic matrix subsequently being carbonized during the rise in temperature needed to finish off densification of the consolidated preform. By way of example, the organic matrix may be formed of a resin of the bismaleimide (BMI) type.

After the pins have been put into place, densification of the consolidated preform is continued (step 40) until the desired degree of density has been reached. Densification is performed by means of a ceramic matrix, e.g. of SiC. For this purpose, a process of densification by chemical vapor infiltration or by a liquid method is used as described in the consolidation step when consolidation is performed by means of an SiC matrix.

Figure 3:
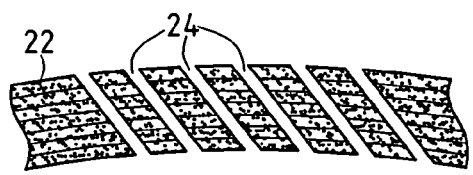
FIG. 3 is a highly diagrammatic section view showing the perforations that are obtained after eliminating pins of the kind used in the implementation of FIG. 1.

Once densification has been finished, the pins are eliminated (step 50) by being oxidized at high temperature, e.g. in the range about 600° C. to 1000° C. For this purpose, the carbon of the pins is laid bare by breaking off the ends of the pins which advantageously project from both sides of the preform and which have become covered in a deposit of ceramic. After the pins have been eliminated, the desired CMC chamber wall 22 is obtained (FIG. 3) having perforations 24 that pass through the wall.

The perforations 24 are defined by the material constituting the matrix and they are calibrated by the diameter of the pins.

Thus, the carbon reinforcing fibers, and even any interphase, remain fully covered in ceramic matrix, even in the vicinity of the perforations. In addition, the way in which the pins are put into place in the consolidated preform has a very limited destructive effect on the fibers since most of them are merely pushed aside rather than being broken when the pins are pushed in.

Matrix phases of refractive material other than carbon or SiC can be provided at the consolidation stage, and ceramic matrices other than SiC can be provided at the stage of densifying the consolidated preform.

Thus, at least at the state of densifying the consolidated preform, it is advantageous to install a self-healing matrix, i.e. a matrix made of a material that is capable, at the temperature at which the CMC is used, of forming a vitreous phase which, by passing into a viscous state, heals cracks that might appear in the matrix and would otherwise give the ambient medium access to the fibers or to any interphase layer. The provision of self-healing ceramic matrices including at least one matrix phase formed by a ternary Si—B—C system is described in U.S. Pat. No. 5,246,736.

Other materials for ceramic matrices or matrix phases can also be used, for example nitrides, carbides other than SiC, or oxide type ceramics. The provision of oxide type ceramic matrices is described in U.S. Pat. No. 4,576,836.

The pins may be made of a material suitable for being eliminated by oxidation other than carbon fibers densified by a carbon or an organic matrix. For example, it is possible to use pins made of ceramic fibers densified by a carbon or an organic matrix, with oxidation of the matrix alone sufficing to eliminate the pins.

Figure 4:
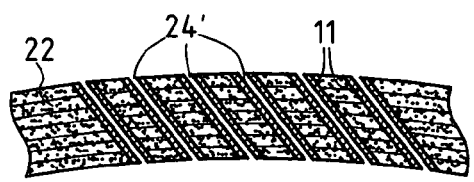
FIG. 4 is a highly diagrammatic section view showing the perforations obtained after eliminating a core portion of pins in another implementation of the invention.

It is not essential for the pins to be eliminated completely. Thus, it is possible to use pins having a core portion of a material that can be eliminated by oxidation or by some other process in association with a sheath of ceramic material. The ceramic sheath is advantageously made of a material of the same type as the ceramic material of the CMC ceramic phase. It may be formed over the core portion by ceramic vapor deposition. It is thus possible to make ceramic material pins coated in an SiC sheath. As shown in FIG. 4, after the core portion has been eliminated, the SiC sheath 11 remains and defines the perforations 24' passing through the CMC wall 22, the perforation 24' being calibrated by the diameter of the core portion of the pins.

The examples below relate to tests performed on the making of multi-perforated parts in accordance with the invention.

EXAMPLE 1

A fiber preform was made by multilayer weaving of SiC fiber yarns supplied under the reference "Hi-Nicalon" by the Japanese supplier Nippon Carbon, the preform comprising ten layers. The pore volume fraction of the preform was approximately equal to 65%.

The preform was consolidated by forming a PyC interphase and depositing SiC by chemical vapor infiltration, with the pore volume fraction being reduced to a value of about 55%.

After consolidation, pins having a diameter of 0.3 mm were put into place, the pins being made of carbon yarns stiffened by being impregnated with a BMI resin. The pins were put into place normally to the multilayer fiber fabric, and they were of a length such as to project from both sides of the preform.

The preform was subsequently densified by a self-healing ceramic matrix of the Si—B—C type, as described in U.S. Pat. No. 5,246,736.

After densification, the projecting ends of the pins were eroded so as to lay their carbon bare. The pins were then eliminated by oxidizing the carbon in air at about 800° C.

Figure 5:
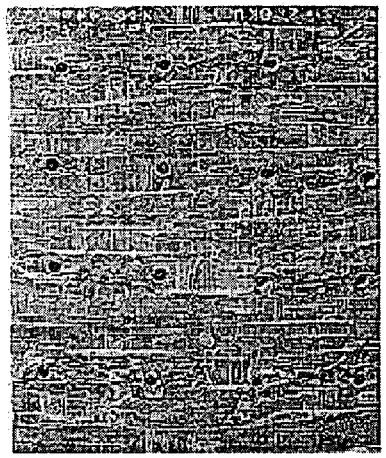
FIGS. 5 and 7 are photographs showing examples of perforations made in accordance with the invention in parts made of thermostructural composite material.
Figure 6:
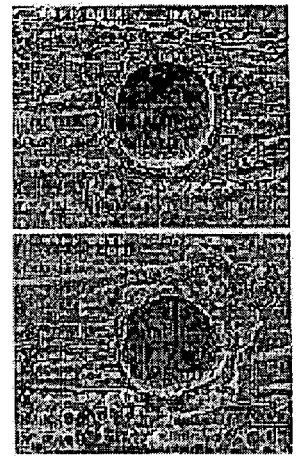
FIGS. 6 and 8 are photographs on a larger scale showing the perforations in the parts of FIGS. 5 and 7.

The photographs of FIGS. 5 and 6 show the resulting perforations. It can be seen that the perforations are very clean in shape.

EXAMPLE 2

A fiber preform was made by multilayer weaving of carbon fiber yarns, the preform comprising five layers. The volume fraction of the pores of the preform was approximately equal to 60%.

The preform was consolidated by depositing SiC by chemical vapor infiltration with the volume fraction of the pores being reduced to a value of about 50%.

After consolidation, 0.3 mm diameter pins were put into place in the preform, the pins being formed by carbon yarns stiffened by being impregnated with a BMI resin. The pins were put implanted at an angle of 45° relative to the normal at the surface of the preform. The pins were long enough to project from both sides of the preform.

Figure 7:
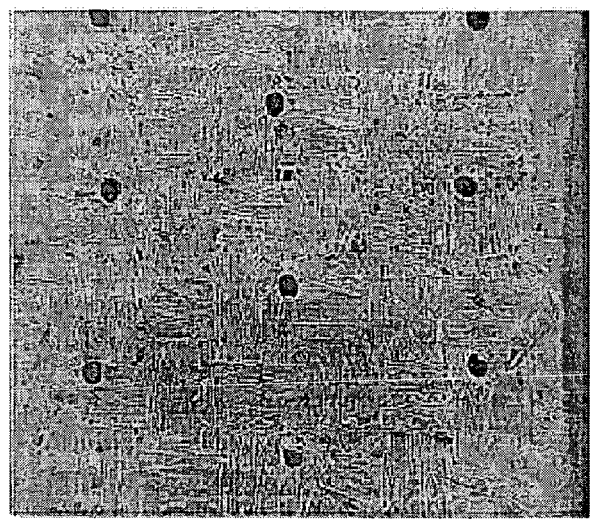
Figure 8:
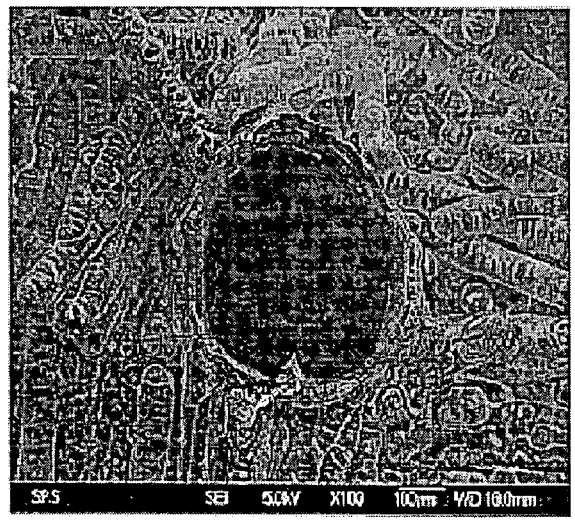

The preform was densified and the pins were then eliminated as in Example 1. The resulting perforations are shown in the photographs of FIGS. 7 and 8.

What is claimed is:

1. A method of making a multi-perforated part out of ceramic matrix composite material, the method comprising the steps of:
   preparing a fiber preform having fibers and pores for constituting a fiber reinforcement of the composite material;
   consolidating the preform by partial densification by forming within the preform a solid matrix phase having a thickness sufficient for binding the fibers of the fiber preform to one another, but without densifying the preform completely, a volume ratio of the pores in the preform being reduced by no more than 40%;
   putting a plurality of pins of rigid material into place through the consolidated preform without the consolidated preform being deformed;
   continuing densification of the consolidated preform provided with the pins by depositing a ceramic material forming at least one ceramic matrix phase; and
   eliminating at least a portion of each pin so as to leave a calibrated perforation passing through the part, the pins being made at least in part out of a material that can be eliminated by applying a treatment that does not affect the deposited ceramic material.

2. A method according to claim 1, wherein the pins put into place are made entirely out of material that can be eliminated.

3. A method according to claim 1, wherein pins are used made with a core portion of material that can be eliminated and a peripheral portion or sheath of ceramic that is not eliminated when the core portion is eliminated.

4. A method according to claim 1, wherein the material of the pins that can be eliminated is eliminated by oxidation.

5. A method according to claim 1, wherein the pins used are made by densifying and stiffening a yarn or tow of carbon by means of a matrix.

6. A method according to claim 1, wherein the pins are put into place by a process comprising initially inserting the pins in a block of compressible material, bringing the block of compressible material into contact with the consolidated preform, and applying ultrasound energy to the pins while compressing the block of compressible material so as to cause the pins to penetrate into the consolidated preform.

7. A method according to claim 1, wherein the pins are implanted in a direction forming a non-zero angle relative to a normal to a surface of the consolidated preform.

8. A method according to claim 1, wherein preform consolidation comprises forming a ceramic matrix phase of small thickness.

9. A method according to claim 1, wherein preform consolidation comprises forming a carbon matrix phase of small thickness.

10. A method according to claim 1, wherein a preform is used in which the volume ratio of the pores has a value lying in the range 50% to 70%, and consolidation is preformed until the volume ratio of the pores is reduced to a value lying in a range 40% to 60%.

11. A method according to claim 1, wherein the preform is densified with a ceramic matrix that includes at least one self-healing phase.

12. A method according to claim 1, for making a multi-perforated wall out of ceramic matrix composite material for a gas turbine combustion chamber.

13. A method according to claim 12, wherein the fiber preform is made by draping two-dimensional fiber plies.

14. A method according to claim 13, wherein the plies are bonded to one another.

15. A method according to claim 14, wherein the fiber preform is made up of a multilayer fabric.

* * * * *